(12) United States Patent
Widmer et al.

(10) Patent No.: US 9,815,374 B2
(45) Date of Patent: Nov. 14, 2017

(54) BRAKING GRID COOLING SYSTEM

(71) Applicants: Gabriel E. Widmer, West Lafayette, IN (US); Bryan E. Ladd, West Carrollton, OH (US); Justin P. Widmer, Battle Ground, IN (US)

(72) Inventors: Gabriel E. Widmer, West Lafayette, IN (US); Bryan E. Ladd, West Carrollton, OH (US); Justin P. Widmer, Battle Ground, IN (US)

(73) Assignee: DAYTON-PHOENIX GROUP, INC., Dayton, OH (US)

( * ) Notice: Subject to any disclaimer, the term of this patent is extended or adjusted under 35 U.S.C. 154(b) by 49 days.

(21) Appl. No.: 14/496,406

(22) Filed: Sep. 25, 2014

(65) Prior Publication Data

US 2016/0089983 A1   Mar. 31, 2016

(51) Int. Cl.
*B60L 7/02* (2006.01)
*H01C 1/082* (2006.01)
*H01C 1/01* (2006.01)

(52) U.S. Cl.
CPC .............. *B60L 7/02* (2013.01); *B60L 2240/36* (2013.01); *H01C 1/01* (2013.01); *H01C 1/082* (2013.01)

(58) Field of Classification Search
CPC ........ B60L 3/0046; B60H 1/004; Y02E 60/16
See application file for complete search history.

(56) References Cited

U.S. PATENT DOCUMENTS

| | | | |
|---|---|---|---|
| 4,051,452 A * | 9/1977 | Luy | H01C 1/08 303/20 |
| 4,100,526 A | 7/1978 | Kirilloff et al. | |
| 4,359,710 A | 11/1982 | Luy | |
| 5,159,310 A | 10/1992 | Cummins et al. | |
| 5,304,978 A | 4/1994 | Cummins et al. | |
| 6,430,045 B1 * | 8/2002 | Everitt | B60T 10/00 188/264 F |
| 6,749,043 B2 | 6/2004 | Brown et al. | |
| 6,995,978 B2 | 2/2006 | Strauss | |
| 7,721,855 B2 | 5/2010 | Marsh et al. | |
| 8,136,643 B2 | 3/2012 | Marsh et al. | |
| 8,922,082 B2 * | 12/2014 | Kwon | A45D 20/12 310/90 |
| 2009/0257869 A1 * | 10/2009 | Li | F04D 25/0613 415/220 |

FOREIGN PATENT DOCUMENTS

| | | |
|---|---|---|
| EP | 0088340 | 9/1983 |
| EP | 2308735 | 4/2011 |
| EP | EP 2308735 A1 * | 4/2011 |

* cited by examiner

*Primary Examiner* — Eduardo Colon Santana
*Assistant Examiner* — Charles S Laughlin
(74) *Attorney, Agent, or Firm* — Thompson Hine LLP (57) ABSTRACT

A braking grid cooling system may include a fan having a hub supporting a rotor and at least partially enclosing a stator, and a plurality of fan blades connected to and projecting radially from the hub; and a dynamic braking grid receiving the fan in a nested relation such that a combined height of the grid and the fan is less than a sum of a height of the grid and a height of the fan.

21 Claims, 5 Drawing Sheets

BRAKING GRID COOLING SYSTEM

TECHNICAL FIELD

This disclosure relates to devices and methods for cooling resistive elements that dissipate heat energy and, more particularly, to systems and methods for cooling dynamic braking grids of a type used in connection with electric traction motors.

BACKGROUND

Certain vehicles, such as diesel-electric locomotives and diesel-electric off-highway mining trucks, are powered by electric fraction motors powered by, for example, alternating current generated by an alternating current (AC) alternator-rectifier or a direct current (DC) generator, that in turn is powered by a diesel engine. Such diesel-electric vehicles commonly use dynamic braking systems. In dynamic braking systems, the armature of each traction motor is connected across a forced-air-cooled resistance grid, known as a dynamic braking grid, which typically is located in the engine compartment of a locomotive or other vehicle.

This configuration is used in braking a diesel-electric engine. To brake a diesel-electric engine, the traction motor, which is driven by the rotating wheels of the moving vehicle, becomes an electric power generator. The electricity from the traction motor is conducted to the braking grid. The braking grid includes a resistance element or elements made of a metallic material that is conductive, but provides resistance to the current received from the traction motor so that the current is converted to heat that is radiated from the resistance elements. Thus, the energy of motion of the locomotive engine, or other vehicle in which this configuration is installed, is converted to heat in the dynamic braking operation mode.

An issue that arises when dynamic braking systems are employed to brake a vehicle, such as a locomotive, traveling at high speed, or when the dynamic braking system is applied to a vehicle traveling downwardly on a relatively steep grade, is that the dynamic braking grid may overheat. Cooling fans typically are employed to direct cooling air over the resistance elements of a dynamic braking grid to maintain the temperature of the resistance elements below a temperature at which damage resistance elements or other components of the braking system might occur. Such fans typically are large in order to provide sufficient air movement uniformly over the entire area of the resistance element, and to utilize the electric power provided to the dynamic braking grid by the traction motors. Such motors also may be shielded to protect their internal components from high external temperatures and corrosive airborne particulates.

Systems of dynamic braking grids and cooling fans take up significant space in the engine compartment of a vehicle, or hood unit of a diesel-electric locomotive or other vehicle in which they are mounted. Accordingly, there is a need for a braking grid cooling system that effectively and efficiently dissipates heat generated by rheostatic braking, and is relatively compact in size.

SUMMARY

In one embodiment, the disclosed braking grid cooling system may include a fan having a hub supporting a motor and at least partially enclosing a stator, and a plurality of fan blades connected to and projecting radially from the hub, and a dynamic braking grid receiving the fan in a nested relation such that a combined height of the grid and the fan is less than a sum of a height of the grid and a height of the fan.

In another embodiment, a diesel-electric vehicle may include a braking grid cooling system may have a fan with a motor having a stator, a dome-shaped hub, a rotor mounted on the hub, and a plurality of fan blades connected to and projecting radially from the hub; and a dynamic braking grid, the braking grid receiving the fan in a nested relation such that a combined height of the grid and the fan is less than a sum of a height of the grid and a height of the fan.

In yet another embodiment, a method of cooling a braking grid may include providing a fan having a hub supporting a rotor and at least partially enclosing a stator, and a plurality of fan blades connected to and projecting radially from the hub; positioning the fan in a nested relation to the braking grid such that a combined height of the grid and the fan is less than a sum of a height of the grid and a height of the fan; and actuating the fan to rotate the hub such that the fan blades move air through the braking grid.

Other objects and advantages of the disclosed braking grid cooling system will be apparent from the following description, the accompanying drawings, and the appended claims.

DETAILED DESCRIPTION

Figure 1:
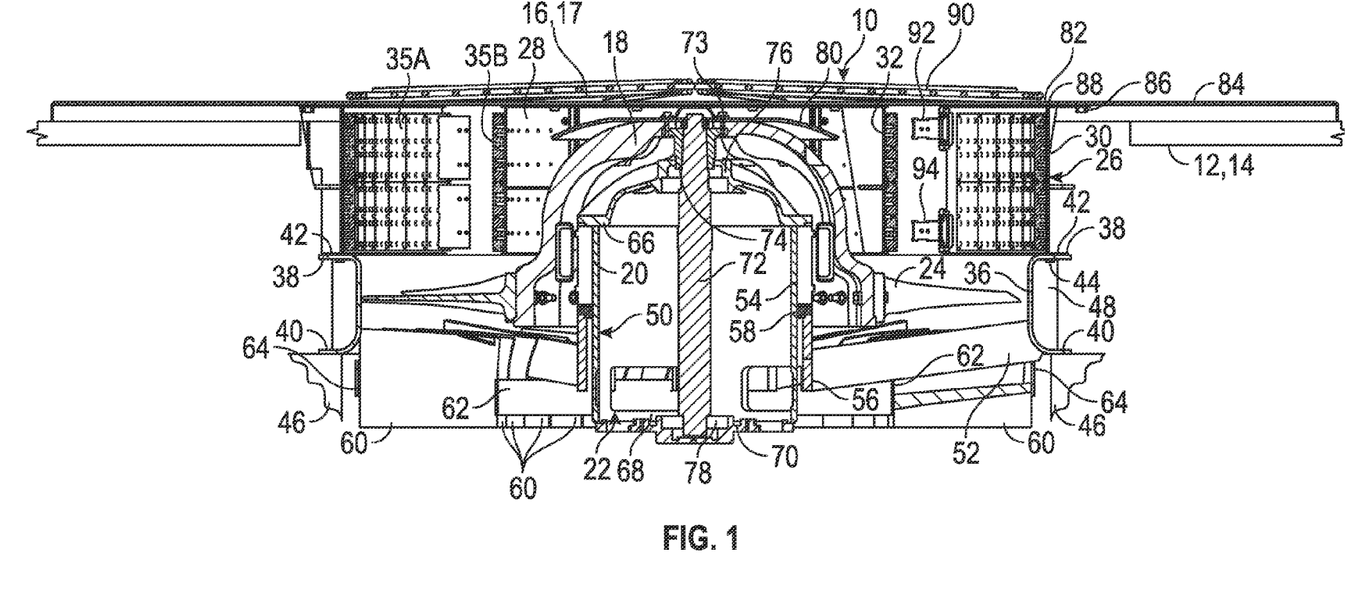
FIG. 1 is a side elevation in section of an embodiment of the disclosed braking grid cooling system, in which the reflexed ribbon of the braking grid is removed for clarity.
Figure 2:
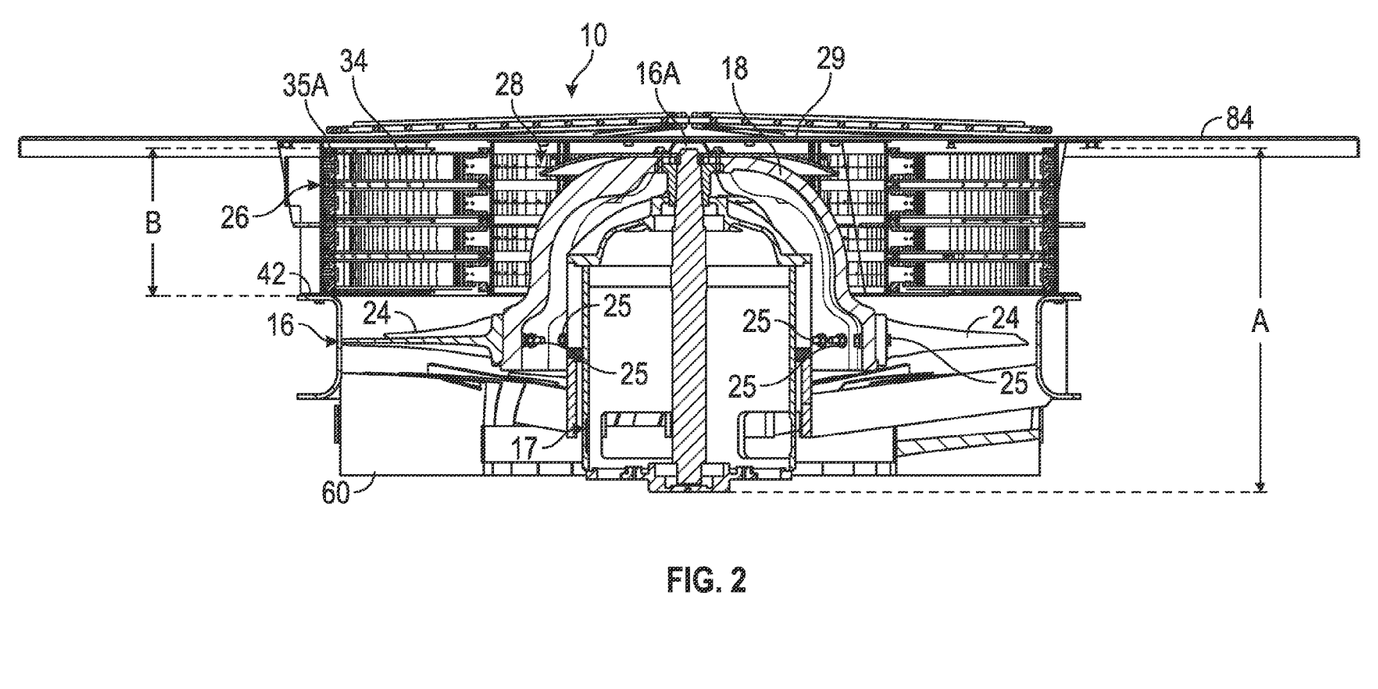
FIG. 2 is a side elevation in section of the embodiment of FIG. 1, in which the reflexed ribbon of the braking grid is shown.

As shown in FIGS. 1 and 2, the disclosed braking grid cooling system, generally designated 10, may be configured to be mounted in the roof panel 12 of the engine compartment of a diesel-electric vehicle 14, which in embodiments may take the form of a locomotive traction engine or a diesel-electric off-highway truck, such as a mining truck. The system 10 may include a fan, generally designated 16. The fan 16 may include a motor 17 having a hub 18 that supports a rotor 20 and at least partially encloses a stator, generally designated 22. The hub 18 may include a plurality of fan blades 24 connected to and projecting radially from the hub.

The fan motor 17 may be either a direct current (DC) or alternating current (AC) motor. The hub 18 may be radially symmetric and parabolic in shape, and made of steel, aluminum, or a corrosion-resistant alloy. The fan blades 24 may be attached to the hub 18 by nut and bolt combinations 25, or attached by other means, such as by welding or brazing, or by a tongue-and-groove engagement. The fan blades 24 also may be made of steel, aluminum, or a corrosion-resistant alloy, and may or may not match the hub 18 in material.

The system 10 also may include a dynamic braking grid, generally designated 26, that receives the fan 16 in a nested relation, such that a combined height of the grid and the fan is less than a sum of the height of the fan, indicated by distance A, and the height of the grid, indicated by distance B. The grid 26 may include a central opening 28 that may receive at least a portion of the hub 18 of the motor 17 therein to provide the nested engagement of the motor 16 and dynamic braking grid 26. In a particular embodiment of the braking grid cooling system 10, the central opening 28 is shaped such that it provides clearance for the hub 18 to nest into the dynamic braking grid 26 so that an upper surface 29 of the grid is even, or is approximately even, with the topmost portion 16A of the fan 16. With that embodiment, the addition of the braking grid 26 does not add to the height of the system 10; the height of the system would be indicated by the distance A in FIG. 2.

In an embodiment, the dynamic braking grid 26 may be cylindrical in shape, and the fan 16 oriented to be concentric with the grid. Also in an embodiment, the central opening 28 may take the form of a passage that extends entirely through the dynamic braking grid 26. In an embodiment, the dynamic braking grid 26 may include a radially outer wall 30 and a radially inner wall 32 adjacent the hub 18 and defining the opening 28. The braking grid 26 may include a plurality of resistor elements that in an embodiment may take the form of flat grid plates 34 (see also FIG. 5). The grid plates 34 may extend in a spoke-like pattern between the outer wall 30 and inner wall 32 that extends about the circumference of the dynamic braking grid 26. In this embodiment, the ends of adjacent grid plates are attached to each other, such as by welding, to form an electrical circuit. In another embodiment, the resistor elements may take the form of a reflexive ribbon that extends between and is attached to the outer wall 30 and inner wall 32.

The grid plates 34 may be attached to and extend between insulators 35A, 35B, which in turn may be attached the outer wall 30 and the inner wall 32, respectively, thereby electrically isolating the grid plates from the outer wall and inner wall. Jumpers (not shown) may connect adjacent grid plates 34 to form an electrical circuit, and/or the ends of adjacent grid plates may be welded to each other. The upper edges of the outer wall 30 and inner wall 32 may constitute the upper surface 29 of the braking grid 26. Embodiments of cylindrical dynamic braking grids similar to dynamic braking grid 26 are illustrated and described in U.S. Pat. Nos. 4,051,452 and 4,359,710. Embodiments of grid plates similar in shape and construction to grid plates 34 are illustrated in U.S. Pat. Nos. 4,651,125; and 4,654,627.

In one embodiment, the lengths of the fan blades 24 equal, or approximately equal, the radial distance from the outer wall 30 to the inner wall 32 of the dynamic braking grid 26. In another embodiment, the working part of the fan blades 24 equals, or approximately equals, the full lengths of the resistor elements or the resistor ribbon 34. Also in certain embodiments, the fan blades 24 may be aligned in an upstream direction with the space between the outer wall 30 and inner wall 32 so that air is moved by the blades across the entire distance between the outer wall and inner wall. In embodiments, the curvature of the fan blades 24 may vary from the blade root to the blade tip so that the velocity of air moved by the fan 17 is uniform, or substantially uniform, across the radius of the dynamic braking grid 26. This uniformity of air flow through the dynamic braking grid 28 and across the grid plates 34 may prevent the formation of hot spots on the plates.

In other embodiments, the curvature of the fan blades 24 may vary so that there is greater airflow nearer the roots of the blades than near the tips of the blades to compensate for increased backpressure that may exist nearer the inner wall 32 than the outer wall 30 of the dynamic braking grid 26. In still other embodiments the blades 24 may vary in length, for example by alternating long and short blades about the hub 18 to increase air flow nearer the inner wall 32, thereby optimizing air distribution, motor horsepower, and mass flow of the system 10.

Figure 3:
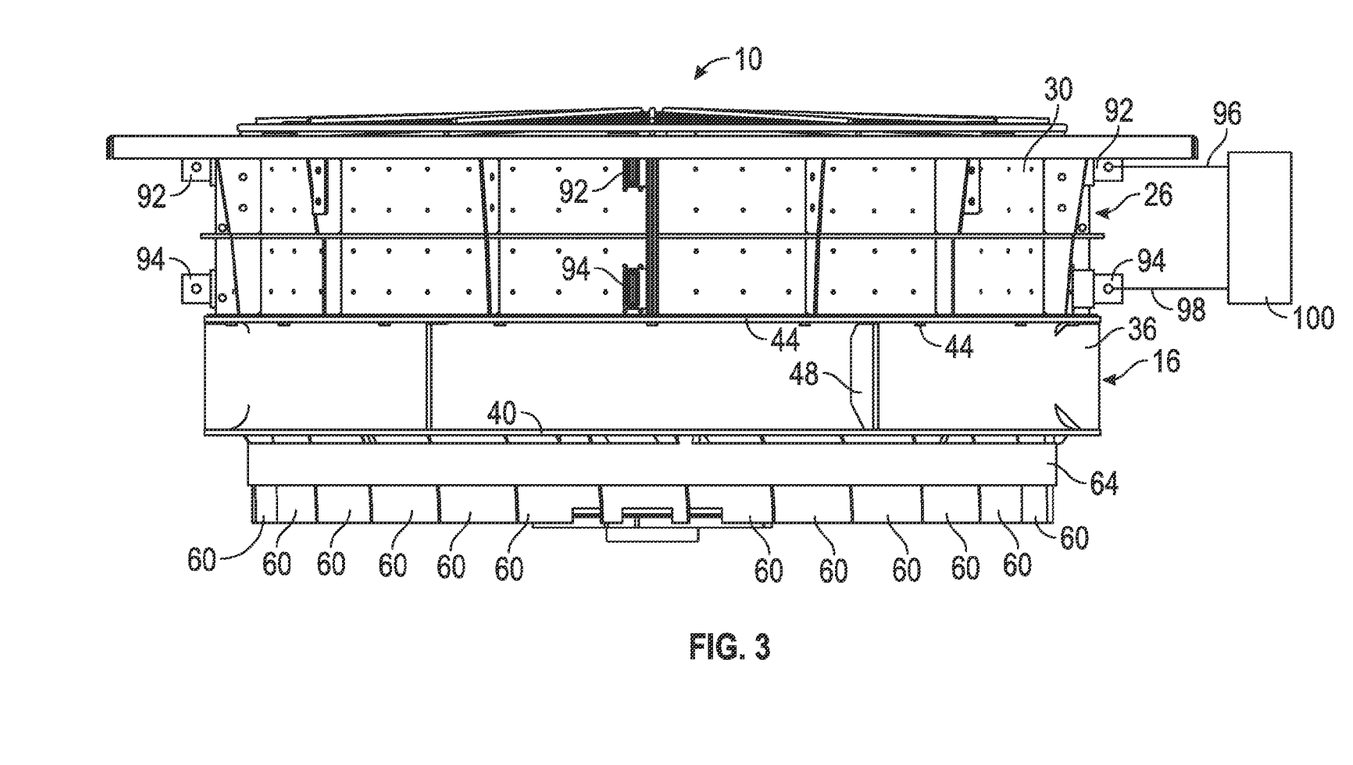
FIG. 3 is a side elevation of the embodiment of the braking grid cooling system of FIG. 1.

As shown in FIGS. 1, 2, and 3, the fan 16 may include a support ring 36. The support ring 36 may be annular in shape and made of a continuous U-shaped channel having an upper flange 38 and a lower flange 40. The upper flange 38 may be attached to a bottom flange 42 of the outer wall 30 of the dynamic braking grid 26 by a ring of nut and bolt combinations 44. The lower flange 40 may be mounted on a bulkhead 46 of the vehicle 14 by bolts (not shown). Accordingly, the support ring 36 may support the fan 16 and dynamic braking grid 26 on the bulkhead 46 below the roof of the roof panel 12 of the vehicle 14. In an embodiment, the support ring 36 may include stiffening gussets 48 that may extend between the upper flange 38 and lower flange 40.

The fan motor 17 may include a stator housing 50 that may be connected to a remainder of the fan 16 by a plurality of support struts 52 extending radially between the stator housing and an inner periphery of the support ring 36, so that the support ring supports the fan motor. In an embodiment, the stator housing 50 also may support the stator windings 54 of the motor 17, which may be positioned immediately adjacent, and be concentric with, the rotor 20. In an embodiment, the stator housing 50 may include an inner support ring 56, which is directly attached to the radially inner ends of the support struts 52, and may be bolted to the stator housing 50 by an intermediate connecting ring 58.

Figure 4:
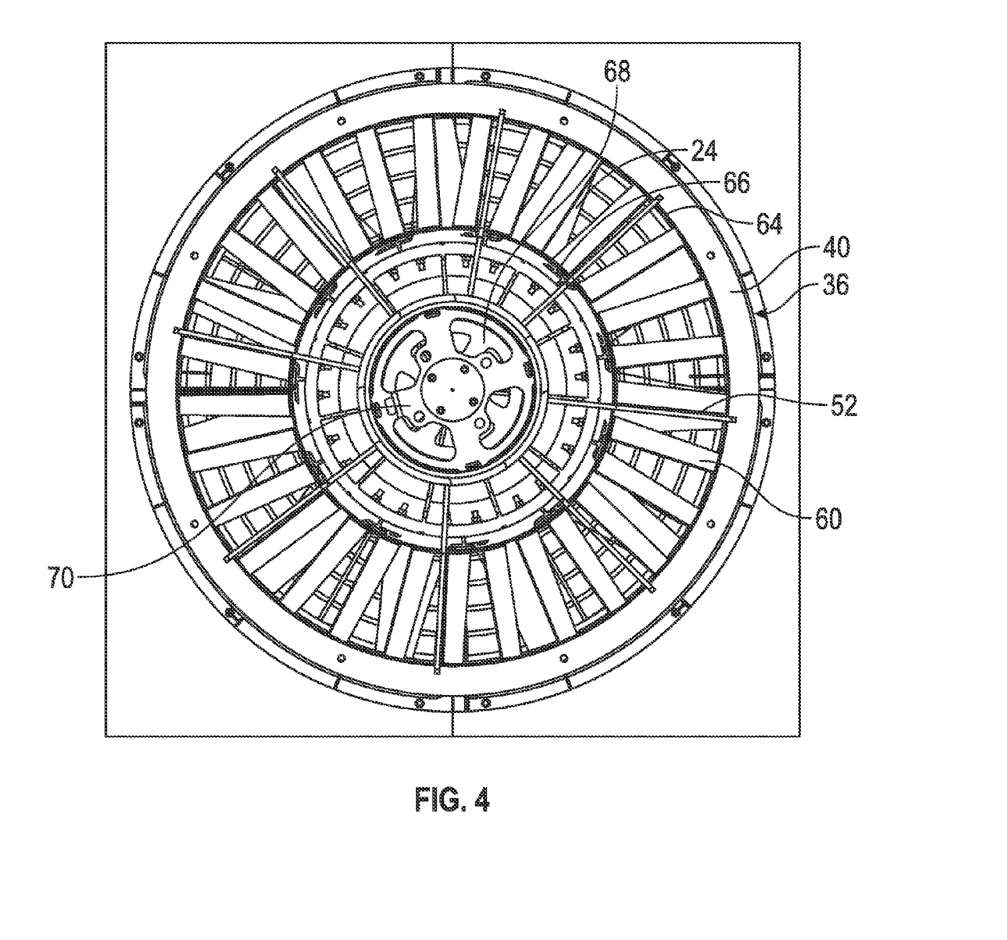
FIG. 4 is a bottom view of the embodiment of the braking grid cooling system of FIG. 1.

The fan 16 may include a plurality of turning vanes 60 attached to the support struts 52 (see also FIG. 4). In an embodiment, the fan 16 may include an inner vane support ring 62, which may be attached directly to the support struts 52, and an outer vane support ring 64, which also may be attached directly to the support struts. The turning vanes 60 may be attached at their radially inner ends to the inner vane support ring 62, and at their radially outer ends to the outer vane support ring 64, so that the turning vanes extend between the inner vane support ring and the outer vane support ring.

As best shown in FIGS. 1 and 4, in embodiments, the vanes 60 may be curved in a longitudinal direction (i.e., in the direction of air flow through the fan 16) to impart a clockwise (when looking down at the system 10 as in FIG. 5) spin to air entering the fan 16 so that rotation of the fan blades 24 to move the air through the dynamic grid resistor 26 will result in substantially linear air flow through the dynamic grid resistor ribbon 34.

As shown in FIG. 1, in embodiments, the stator housing 50 may take the form of a cylindrical body and the stator 22 may include a top cover 66 attached to the cylindrical body 50 and a bottom flange 68 that may be attached to or formed integrally with the body (see also FIG. 4). The stator 22 also may include an end plate 70 attached to the end flange 68. The rotor 16 may include a central shaft 72 rotatably mounted on the top cover 66 and end plate 70. In an embodiment, the central shaft 72 may be attached to the hub 18 by bolts 73. Bolts 73 also may attach the hub 18 to an annular mounting collar 74 shaped to receive an upper end of the central shaft 72.

The motor 17 may include an upper bearing 76 that supports the central shaft 72 against the top cover 66. The end flange 70 may include a thrust bearing 78 that may receive a lower end of the central shaft 72 for relative rotation. The hub 18 may include a cover plate 80 that may be in the shape of a slightly concave disc that may be attached to the hub by the bolts 73. As shown in FIG. 1, the hub 18 may be nested within the passage 28 to not extend above an upper surface 82 of the braking grid 26.

Figure 5:
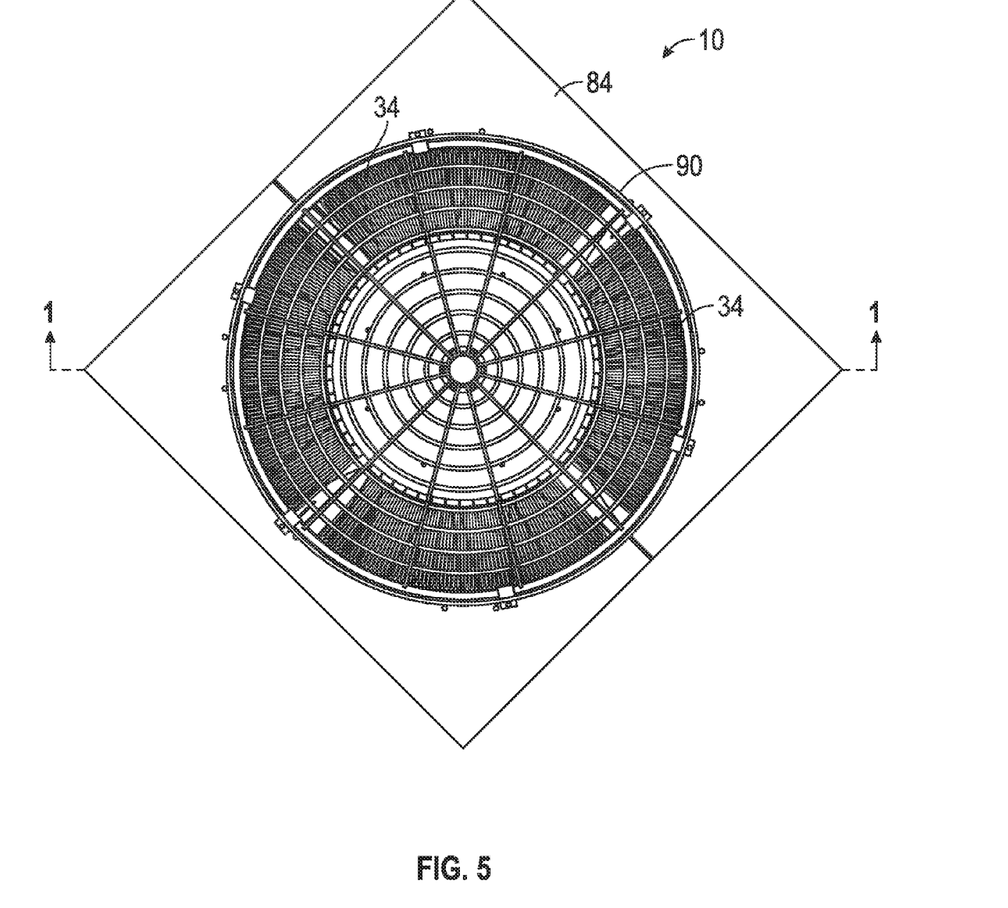
FIG. 5 is a top plan view of the embodiment of the braking grid cooling system of FIG. 1.

As shown in FIG. 5, the system 10 may include a substantially rectangular, two-piece cover plate 84 that may be attached by bolts 86 to an upper flange 88 of the outer wall 30 of the dynamic braking grid 26. In other embodiments, the cover plate may take different shapes in order to fit onto the roof panel 12 of the vehicle 14 (FIG. 1). The other shapes may be regular shapes, such as regular polygonal shapes, or irregular shapes. In an embodiment, the cover plate 84 may include a protective grid 90. The panel 84 and grid 90 may be mounted on the upper surface of the roof 12 of a vehicle 14.

As shown in FIGS. 3 and 5, the dynamic braking grid 26 may have the resistor elements, for example in the form of grid plates 34, divided into connected segments approximately equal in size, each including contacts 92, 94 that may be connected to power cables 96 (only one pair shown) connected to a source 100 of electric current, which in some embodiments may take the form of a main traction generator, in the case of a diesel-electric locomotive or diesel-electric off-highway truck, and in other embodiments, the supply of an electric locomotive or electric vehicle. In the embodiment shown, the braking grid 26 is shown divided into four quadrants approximately equal in size. In other embodiments, the braking grid 26 may be divided into more segments, such as six, for fewer, such as three. Preferably, the segments are approximately equal in size.

In operation, the braking grid cooling system 10 first may be assembled by providing a radial dynamic braking grid 26 having a central opening 28. The braking grid 26 may be attached to a fan 16 by connecting the upper flange 38 of the fan ring 36 of the fan to a bottom flange 42 of the outer wall 30 of the dynamic braking grid by, for example a ring of nut and bolt combinations 44. The hub 18 of the motor 17 of the fan 16 is nested within the central opening 28 so that the blades 24 of the fan are longitudinally aligned and immediately upstream of (i.e., there is no intervening structure) the reflexive ribbon 34 of the dynamic braking grid 26.

The fan 17, and more particularly the fan hub 18, nests within the opening 28 of the braking grid 26 such that overall height of the combined braking grid 26 and fan 17 is less than the sum of the heights of each (measured in a fan axial direction), and in a particular embodiment, the overall height is the same as, or is substantially the same as, the height of the fan.

The dynamic braking grid 26 may receive electric current from a power source 100, which may take the form of a main traction generator, over cables 96, 98 connected to contacts 92, 94. The electric current passes through and the grid plates 34 of the dynamic braking grid 26 and heats the plates because of the resistance of the material of the plates. Electric current received by the braking grid 26 also may be used to power the motor 17 of the fan 16, which would require electrically connecting the motor to the grid plates 34.

Actuation of the fan motor 17 of the fan 16 may cause the rotor 20 to rotate relative to the stator 22. Rotation of the fan blades 24 mounted on the rotor 20 draws air upwardly through the system 10, as shown in FIGS. 1, 2 and 3. The flow of ambient air entering the fan 16 may be given an initial twist, for example in a clockwise direction, as it passes over the vanes 60. This twist may result in substantially linear air flow of air as it leaves the spinning fan blades 24 and travels upwardly into the dynamic braking grid 26. Rotation of the blades 24 causes the air to continue to move upwardly across the reflexive ribbon 34 of the dynamic braking grid 26, thereby cooling the ribbon.

The disclosed configuration of the braking grid cooling system 10 operates efficiently because the braking grid resistor 26, and in particular the grid plates 34 of the braking grid resistor, may be positioned immediately downstream of, and directly adjacent (meaning that there is no intervening structure) the fan blades 24. The overall height of the system 10 may be more compact in a height dimension than are prior art cooling grid systems as a result of the nested relationship between the fan 16 and dynamic braking grid 26, and in particular the nested relationship between the fan motor 17 and the braking grid.

An advantage of the braking grid cooling system 10 is that the resistive braking capacity of the system may be increased without increasing the height of either the fan 16 or the braking grid resistor 26, and thus without increasing the overall height of the combination fan and braking resistor. Rather, the dynamic braking capacity of the system 10 may be increased by increasing the diameter of the dynamic braking grid 26, and correspondingly the diameter of the fan blades 24. Increasing the dynamic braking grid diameter 26 increases the radial lengths of the resistance elements spanning the distance between the outer wall 30 and inner wall 32, thereby increasing the amount of element resistive surface per unit of grid height. In applications where additional element surface area is needed to dissipate the energy due to the circuitry needs of the vehicle 14, the diameter of the dynamic braking grid 26 may be increased to increase the total surface area of the resistor elements, rather than adding elements vertically. Similarly, the diameters of both the outer wall 30 and inner wall 32 of the braking grid 26 may be increased such that the lengths of the resistor elements 34 remains the same as for a braking grid of a smaller diameter. But since the circumferences of the outer wall 30 and inner wall 32 are increased, there is room for additional resistor elements 34, which may provide a greater surface area of resistor elements and greater cooling capacity for a given height B (FIG. 2). This capacity may be increased further by increasing the root diameter and tip diameter of the fan blades 24 to match and align with the grid resistor elements 34.

While the forms of apparatus and methods described herein constitute preferred embodiments of the disclosed braking grid cooling system, it is to be understood that the invention is not limited to these precise forms and methods, and that variations may be made therein without departing from the scope of the invention.

What is claimed is:

1. A braking grid cooling system, the system comprising:
a fan having a hub supporting a rotor and at least partially enclosing a stator, and a plurality of fan blades connected to and projecting radially from the hub at an end thereof;
a dynamic braking grid having a radially outer wall, a radially inner wall adjacent the hub, the radially inner wall defining a central opening in the form of a passage that extends entirely through the dynamic braking grid, and a plurality of resistor elements extending between the radially outer wall and the radially inner wall, the passage receiving the fan hub in a nested relation to the dynamic braking grid such that a combined height of the dynamic braking grid and the fan is less than a sum of a height of the grid and a height of the fan; and the fan blades positioned upstream and outside of the passage and aligned in an upstream direction with a space between the outer wall and the inner wall such that the fan blades move air in a longitudinal direction relative to the fan and in a linear flow through the dynamic braking grid and across the resistor elements to thereby cool the dynamic braking grid as it heats up when it receives electric current from a power source to power the fan.

2. The system of claim 1, wherein the fan blades are aligned so that air is moved by the fan blades across the entire distance between the radially outer wall and the radially inner wall.

3. The system of claim 2, wherein the dynamic braking grid is cylindrical in shape, and the fan is concentric with the grid.

4. The system of claim 3, wherein the central opening is a passage that extends through the dynamic braking grid.

5. The system of claim 4, wherein the grid includes an insulator electrically isolating the resistor elements from the outer wall and the inner wall.

6. The system of claim 5, wherein the fan includes a support ring, and the support ring is attached to the grid outer wall.

7. The system of claim 6, wherein the support ring is shaped to be mounted on a bulkhead, and wherein the support ring supports the fan and braking grid.

8. The system of claim 6, wherein the fan includes a stator housing and a plurality of support struts extending between the stator housing and the support ring.

9. The system of claim 8, wherein the fan includes a plurality of turning vanes attached to the support struts.

10. The system of claim 9, wherein the fan includes an inner vane support ring attached to the support struts and an outer vane support ring attached to the support struts; and wherein the vanes are attached to and extend between the inner vane support ring and the outer vane support ring.

11. The system of claim 10, wherein the stator housing includes a cylindrical body and a mounting ring attached to the body; and wherein the support struts are attached to the mounting ring.

12. The system of claim 11, wherein stator includes a top flange and a bottom flange; and the stator includes an end plate attached to the end flange.

13. The system of claim 12, wherein the rotor includes a central shaft rotatably mounted on the top flange and end plate; and wherein the hub is attached to the central shaft.

14. The system of claim 1, wherein the hub is nested in the passage to not extend above an upper surface of the braking grid.

15. A diesel-electric vehicle having a roof panel, the vehicle comprising:
a braking grid cooling system mounted in the roof panel the system including a fan having a motor with a stator, a dome-shaped hub, a rotor mounted on the hub, and a plurality of fan blades connected to and projecting radially from the hub at an end thereof:
a dynamic braking grid extending below the roof panel the dynamic braking grid having a radially outer wall, a radially inner wall adjacent the hub, the radially inner wall defining a central opening in the form of a passage that extends entirely through the dynamic braking grid, and a plurality of resistor elements extending between the radially outer wall and the radially inner wall, the passage opening receiving the fan hub in a nested relation to the dynamic braking grid such that a combined height of the dynamic braking grid and the fan is less than a sum of a height of the grid and a height of the fan; and
the fan blades positioned upstream and outside of the passage and aligned in an upstream direction with a space between the outer wall and the inner wall such that the fan blades move air in a longitudinal direction relative to through the fan and in a linear flow through the dynamic braking grid and across the resistor elements to thereby cool the dynamic braking grid as it heats up when it receives electric current from a power source to power the fan.

16. The vehicle of claim 15, wherein the fan blades are positioned immediately upstream of the braking grid such that rotation of the hub causes air to pass through the grid in an axial direction of the fan and in an axial direction of the dynamic braking grid.

17. The vehicle of claim 16, wherein the fan includes a support ring and a plurality of turning vanes extending between the motor and the support ring immediately upstream of the fan blades.

18. The vehicle of claim 17, wherein the support ring is attached to and supports the dynamic braking grid.

19. The vehicle of claim 17, wherein the fan includes a plurality of support struts connecting the motor to the support ring, and the turning vanes are attached to and supported by the support struts.

20. The vehicle of claim 5, wherein the vehicle is selected from a diesel-electric locomotive traction engine, and a diesel-electric off-highway mining truck.

21. A method of cooling a dynamic braking grid, the braking grid having a radially outer wall, a radially inner wall defining a central opening in the form of a passage that extends entirely through the dynamic braking grid, and a plurality of resistor elements extending between the radially outer wall and the radially inner wall connected to power the fan, the method comprising:
providing a fan having a hub supporting a rotor and at least partially enclosing a stator, and a plurality of fan blades connected to and projecting radially from the hub at an end thereof: positioning the fan in a nested relation to the dynamic braking grid such that a combined height of the dynamic braking grid and the fan is less than a sum of a height of the grid and a height of the fan, and the fan blades are positioned upstream and outside of the passage and aligned in an upstream direction with a space between the outer wall and the inner wall such that the fan blades move air in a longitudinal direction through the fan and in a linear flow through the dynamic braking grid and across the resistor elements to thereby cool the dynamic braking grid as it heats up when it receives electric current from a power source to power the fan; and
actuating the fan to rotate the hub such that the fan blades move air through the braking grid in a linear direction parallel to an axis of the fan and an axis of the dynamic braking grid, and upwardly through the dynamic braking grid.

* * * * *

UNITED STATES PATENT AND TRADEMARK OFFICE
CERTIFICATE OF CORRECTION

| | | |
|---|---|---|
| PATENT NO. | : 9,815,374 B2 | Page 1 of 1 |
| APPLICATION NO. | : 14/496406 | |
| DATED | : November 14, 2017 | |
| INVENTOR(S) | : Gabriel E. Widmer, Bryan E. Ladd and Justin P. Widmer | |

It is certified that error appears in the above-identified patent and that said Letters Patent is hereby corrected as shown below:

In the Claims

In Claim 15, Column 8, Line 2 reads:
"passage opening receiving the fan hub in a nested"
It should read:
-- passage receiving the fan hub in a nested --

In Claim 15, Column 8, Line 11 reads:
"relative to through the fan and in a linear flow through"
It should read:
-- relative to the fan and in a linear flow through --

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*